United States Patent Office 3,849,459
Patented Nov. 19, 1974

3,849,459
CATALYTIC COMPOUNDS AND PROCESSES FOR THEIR PREPARATION
Peter M. Maitlis, Hamilton, Ontario, Canada, Colin White, Selby, England, Jung W. Kang, Clinton, Ohio, and Devinder S. Gill, Hamilton, Ontario, Canada, assignors to Canadian Patents and Development Limited, Ottawa, Ontario, Canada
No Drawing. Filed May 4, 1972, Ser. No. 250,203
Claims priority, application Canada, May 25, 1971, 113,732
Int. Cl. C07f 15/00
U.S. Cl. 260—429 CY    8 Claims

ABSTRACT OF THE DISCLOSURE

New catalytic compounds useful for example for hydrogenation of olefins comprise hydrided compounds of rhodium and/or iridium believed characterised by the general formula $(C_5R_5M)_2H_xL_{4-x} \cdot yHL$, and having at least one hydrogen in an unusual bridging position between the two metal atoms, where $C_5R_5$ are the cyclopentadienyl ring and its substituted derivatives, M is the rhodium and/or iridium, L is a specific anionic ligand, $x$ is a number from 1 to 3, and $y$ is 0 or 1. These materials preferably are produced by processes involving hydriding of a precursor of general formul $(C_5R_5MX_2)_2$.

FIELD OF THE INVENTION

The present invention is concerned with new compounds capable of use as catalysts in chemical reactions and processes for the preparation of such compounds.

DESCRIPTION OF THE PRIOR ART

It is a constant endeavour in the field of chemical reactions to provide new catalytic compounds. An important class of reactions in which such compounds are employed is the hydrogenation of olefins, and a typical heterogeneous catalyst for such reactions is a finely divided platinum metal dispersed on an inert carrier, such as finely divided carbon or silica, the metal being deposited on the carrier by reduction from a solution of a salt thereof.

Over the past few years new homogeneous catalysts have been introduced in which, for example, rhodium atoms are each attached to a relatively large organic ligand to provide a relatively stable compound. Such catalysts offer the possibility of carrying out the respective reactions homogeneously in solution, with increases in rates, yields and activity. Typical of such homogeneous catalysts are, for example chlorotris (triphenylphosphine) rhodium, $(Ph_3P)_3RhCl$ and the corresponding carbonyl $(Ph_3P)_3RhH(CO)$. These materials are somewhat insoluble in common organic solvents and in solution they tend to dissociate to give triphenylphosphine, which may have a deleterious effect on some of the reactions. Another known form of homogeneous catalyst in which a metal atom having catalytic properties is attached to wholly inorganic ligands is, for example, rhodium trichloride hydrate, used in nonaqueous solvents; this catalyst unfortunately is easily deactivated by reduction to metallic rhodium and, since its properties vary with the source of the material, the reactions frequently are not reproducible.

DEFINITION OF THE INVENTION

It is the principal object of the present invention to provide new catalytic materials and process of preparing such materials.

It is a particular object to provide new catalytic materials, and processes of preparing such materials, which materials incorporate rhodium and/or iridium and are usable homogeneously.

In accordance with the present invention there are provided new catalytic hydrided compounds of rhodium or iridium or a mixture of rhodium and iridium having the general formula $(C_5R_5M)_2H_xL_{4-x} \cdot yHL$ where $C_5$ is the cyclopentadienyl ring,
$R_5$ is the methyl group substituents attached to the ring,
M is rhodium or iridium or a mixture of rhodium and iridium,
H is hydrogen,
L is any one of halide, trifluoroacetate or hexafluorophosphate,
$x$ is any number from 1 to 3, and
$y$ is 0 or 1.

Also in accordance with the present invention there is provided a new process for the production of catalytic compounds comprising the step of hydriding a precursor compound by a specific hydriding step to a compound of general formula given in the preceding paragraph.

These new compounds are derived, for example, by a suitable hydriding reaction carried out on a precursor of the general formula $(C_5R_5MX_2)_2$ where X is a halide, usually the chloride.

Such precursor compounds are disclosed in Journal of the American Chemical Society, 91:22, Oct. 22, 1969, pages 5970–7. The hydriding may for example, comprise reaction with hydrogen in a solvent, or with hydrogen in the presence of a base in a solvent, or with an active hydride (such as sodium borohydride) in a solvent.

It is at present believed that a typical precursor compound in which R is methyl and X is the chloride may be represented by the structural formula (a), while a corresponding hydrided catalytic material derived therefrom may be represented by the formula (b):

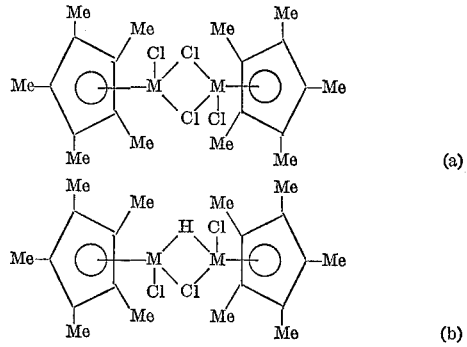

We have found that the materials in accordance with the invention prepared to date have the advantage of high solubility in a variety of commonly available solvents, without the need for coordinating solvents or ligands; they are highly reactive while not volatile; the products usually are easily isolated and obtained quantitatively, i.e. in the expected quantity without substantial wasteful side reactions. The catalytic material is recovered essentially quantitatively at the end of the reaction in which it is involved.

The hydriding step may be effected using as a hydriding agent one of sodium borohydride in isopropanol, hydrogen gas, hydrogen gas in triethylamine, and potassium hydroxide in isopropanol.

It will be seen from formula (b) above that the hydrogen required by the general formula is postulated as in a bridging position, between and joining the two metal atoms; this is an unusual behaviour for hydrogen and may upon investigation provide an explanation of the unexpectedly excellent catalytic properties of these new hydrides. The presence of linking hydride bonds was determined by NMR and IR analysis.

DESCRIPTION OF THE PREFERRED EMBODIMENTS

Example 1

Sodium borohydride in the amount of 0.085 g. was added to a solution of 0.43 g. of precursor dichloropentamethylcyclopentadienyliridium $(C_5Me_5IrCl_2)_2$, in 15 ml. of isopropanol. The reaction mixture was stirred for four hours and then worked up by conventional procedures of solvent removal under vacuum and crystallisation of the resulting compound from a mixture of benzene and cyclohexane. A quantitive yield was obtained of red crystals of $\mu$-chloro-$\mu$-hydridodichlorobis(pentamethylcyclopentadienyl)di-iridium $[(C_5Me_5Ir)_2HCl_3]$.

Example 2

Hydrogen gas was bubbled for about one hour through a solution of 0.62 g. of $(C_5Me_5RhCl_2)_2$ and 3 ml. of triethylamine in 25 ml. of methylene chloride. A 76% by weight yield was obtained of $\mu$-chloro-$\mu$-hydridodichlorobis(pentamethylcyclopentadienyl)di-rhodium $$[C_5Me_5Rh)_2HCl_3]$$

in the form of brown crystals.

Example 3

Hydrogen gas was bubbled for about 50 minutes through a stirred solution of 0.6 g. of $$[C_5Me_5Rh(OCOCF_3)_2H_2O]_n$$

in 2.5 ml. of benzene. The subsequent work up gave a 64% by weight yield of red crystals of a complex which, in accordance with the general formula for the materials of the invention may be represented as $$[(C_5Me_5Rh)_2H(OCOCF_3)_2][H(OCOCF_3)_2]$$

Thus spectroscopic analysis shows a structure $$[C_5Me_5RhH(OCOCF_3)_2RhC_5Me_5]^+[H(OCOCF_3)_2]^-$$

which is salt of the di-$\mu$-trifluoroaceto-$\mu$-hydridobis(pentamethylcyclopentadienyl)di-rhodium monocation and is more simply represented as $(C_5Me_5Rh)_2H_2(OCOCF_3)_4$.

Example 4

The process of Example 3 was repeated, but with the additional step of treating the solution before work-up with aqueous ammonium hexafluorophosphate $$(NH_4PF_6)$$

The process resulted in a 70% by weight yield of $$[C_5Me_5RhH(OCOCF_3)_2RhC_5Me_5]^+[PF_6]^-$$

in the form of orange crystals.

Example 5

The process of example 3 was repeated using 0.23 g. of $[C_5Me_5Ir(OCOCF_3)_2H_2O]_n$ in 10 ml. of benzene and resulted in a 71% by weight yield of yellow-red crystals of the corresponding salt of the di-$\mu$-trifluoroacetato-$\mu$-hydridobis(pentamethylcyclopentadienyl)di-iridium monocation comprising the complex $(C_5Me_5Ir)_2H_2(OCOCF_3)_4$, the structure being similar to that of $$(C_5Me_5Rh)_2H_2(OCOCF_3)_4$$

Example 6

The process of example 5 was repeated with the added step of example 4 to result in a 70% by weight yield of $[C_5Me_5IrH(OCOCF_3)_2IrC_5Me_5]^+[PF_6]^-$ in the form of yellow crystals.

Example 7

A solution of 0.52 g. of $[C_5Me_5Ir(OCOCF_3)_2H_2O]_n$ in 20 ml. of benzene at 24° C. was treated with hydrogen gas supplied at 1 atmosphere for 36 hours. Upon working up by solvent removal and drying the residue in vacuo a 90% by weight was obtained of the corresponding salt of di - $\mu$ - hydrido-$\mu$-trifluoroacetatobis(pentamethylcyclopentadienyl)di-iridium monocation, a complex found by spectroscopic analysis to have the formulation $$[C_5Me_5IrH_2(OCOCF_3)IrC_5Me_5]^+[H(OCOCF_3)_2]^-$$

and more simply represented as $$(C_5Me_5Ir)_2H_3(OCOCF_3)_3$$

Example 8

The complex resulting from example 7 was converted to $[C_5Me_5IrH_2(OCOCF_3)IrC_5Me_5]^+[PF_6]^-$ by treatment of the hydrogenated solution with aqueous ammonium hexafluorophosphate, giving a 60% by weight yield of orange-brown crystals.

Example 9

A solution of 0.3 g. of $[C_5Me_5Ir(OCOCF_3)_2H_2O]$ and 0.5 g. of triethylamine in 10 ml. of benzene was hydrogenated at 25° C. by exposure to hydrogen gas with stirring for a period of 60 hours. The direct product resulting from the work-up was crystallized from a mixture of methylene chloride and light petroleum as a yellow methylene chloride solvate. The yield was 62% by weight and the compound was determined to be the salt of tri-$\mu$ - hydridobis(pentamethylcyclopentadienyl)di - iridium, having the structure $$[(C_5Me_5Ir)_2H_3]^+[OCOCF_3]^-.2CH_2Cl_2$$

Example 10

The product of example 9 was converted to the yellow crystalline $[(C_5Me_5Ir)_2H_3]^+[PF_6]^-$ by reaction with ammonium hexafluorophosphate.

Further examples

A number of olefin hydrogenation reactions were performed using new catalytic materials in accordance with the invention and examples 11 to 28 below are illustrative of such reactions. It was found in general that in the reactions carried out the iridium metal compound exhibited more catalytic activity than the corresponding rhodium metal compound. The activity of the latter could be increased by the addition of base, for example triethylamine, while the iridium metal compounds appeared to be deactivated upon the presence of large amounts of base. As indicated above both catalysts were recovered essentially quantitatively at the end of the reactions.

Example 11

A solution at 25° C. of 0.97 g. of cyclohexene and 0.025 g. of $[(C_5Me_5Rh)_2HCl_3]$ in 19 ml. of isopropanol was stirred in the presence of hydrogen gas at 1 atmosphere pressure. Approximately half of the cyclohexene was converted to cyclohexane in about 13 minutes and hydrogenation was complete at the end of 50 minutes. No other products were detectable by vapour phase chromatography or NMR analysis.

Example 12

A solution at 25° C. of 0.89 g. of allylbenzene and 0.012 g. of $[(C_5Me_5Rh)_2HCl_3]$ in 5 ml. of isopropanol was hydrogenated by hydrogen gas at about 100 atmospheres pressure. The allylbenzene was completely hydrogenated to propylbenzene after 3½ hours; no other products were detected by NMR analysis.

Examples 13–28

The following table comprising examples 13 to 28 show a number of hydrogenation reactions using different mono-olefins and two different catalysts. Examples 14, 15, 17–19, 21, 23, 25 and 27 also illustrate the change in reactivity obtained with the addition of base to the metal catalyst.

In each of the examples 11.8 millimal (mmol.) of the mono-olefin and 0.08 mmol. of the catalyst were dissolved in 19 ml. of isopropanol and treated at 24° C. with hydrogen gas at 1 atmosphere. The catalyst and solvent were presaturated with hydrogen for 10 minutes before the olefin was added. The figure given in the right-hand column of the table for hydrogen uptake is the initial rate measured during the first ten minutes of the reaction and is expressed in ml. per minute. The base used was triethylamine. Catalyst A was [$(C_5Me_5Rh)_2HCl_3$] while catalyst B was [$C_5Me_5Ir)_2HCl_3$].

| Example number | Olefin | Catalyst | Base, mmol | H²-uptake |
|---|---|---|---|---|
| 13 | Cyclohexene | A | 0 | 1.3 |
| 14 | | A | 0.08 | 2.3 |
| 15 | | A | 0.72 | 4.8 |
| 16 | | B | 0 | 7.8 |
| 17 | | B | 0.08 | 9.9 |
| 18 | | B | 0.72 | 5.0 |
| 19 | Cyclopentene | A | 0.72 | 5.6 |
| 20 | | B | 0 | 5.7 |
| 21 | 4-methylpent-1-ene | A | 0.72 | 10.1 |
| 22 | | B | 0 | 3.0 |
| 23 | 2-methylpent-1-ene | A | 0.72 | 3.1 |
| 24 | | B | 0 | 4.6 |
| 25 | cis-4-methylpent-2-ene | A | 0.72 | 2.9 |
| 26 | | B | 0 | 4.2 |
| 27 | trans-4-methylpent-2-ene | A | 0.72 | 1.5 |
| 28 | | B | 0 | 2.7 |

The progressive increase in $H_2$ uptake rate in examples 13 to 15 with rhodium metal catalyst upon the addition of base may be noted. Examples 16 and 17 show the corresponding increase obtained with iridium metal catalyst and a small amount of base, while example 18 shows the decrease obtained with the latter catalyst upon increasing the quantity of base to that of example 15. The preferred amount of amine for a rhodium metal catalyst is up to 1000 mol percent of the catalyst material, while the preferred amount for an iridium metal catalyst is only up to 150 mol percent. Usually a minimum of about 50 mol percent is employed. Bases other than basic amines can be used, such as carbonates.

Example 29

A solution at 25° of 0.08 mmol. of $(C_5Me_5Ir)_2H_2(OCOCF_3)_4$ in 19 ml. of ethyl acetate was presaturated with hydrogen at 1 atm. for 10 minutes. Cyclohexene (11.8 mmol.) was added and the rate of hydrogen uptake was determined to be 5.8 ml. per minute. The addition of 0.08 mmol. of triethylamine deactivated the catalyst.

Example 30

A solution of 25° of 0.08 mmol. of

[$(C_5Me_5If)_2H_3$]$^+$[$OCOF_3$]—$2CH_2Cl_2$ in 19 ml. of ethyl acetate was presaturated with hydrogen at 1 atm. for 10 minutes. Cyclohexene (11.8 mmol.) was added and the rate of hydrogen uptake was determined to be 0.3 ml. per minute. On the addition of 0.08 mmol. of triethylamine to the solution the rate of hydrogen uptake increased to 3.0 ml. per minute. Further triethylamine deactivated the catalyst.

Examples 31 and 32 illustrate other reactions that can be catalysed by the materials of the present invention, example 31 being an isomerisation reaction while example 32 is an olefin hydroformylation, such as is used for the industrial preparation of long chain alcohols used in the manufacture of detergents and plasticizers.

Example 31

Sixty microlitres of cis-4-methyl-2-pentene in 0.3 ml. of benzene containing 0.012 g. of [$(C_5Me_5Ir)_2HCl_3$] was allowed to isomerise at 25° C. under nitrogen. Equilibrium was attained after 1 hour at which time, as determined by NMR analysis, the proportion of isomers obtained were 8% of cis-4-methyl-2-pentene, 81% of 2-methyl-2-pentene and 11% of 2-methyl-1-pentene.

Example 32

A solution of 0.05 g. of [$(C_5Me_5Rh_2)HCl_3$] and 3 ml.

of 1-hexene in 2 ml. of benzene at 90° C. was treated with hydrogen and carbon monoxide in molar ratio 1:1 at 100 atmospheres for 24 hours. As determined by NMR analysis the product contained a mixture of 1- and 2-heptanal in the ratio 1.8:1, the total yield by weight being about 13%.

We claim:

1. Hydrided compounds of rhodium or iridium or a mixture of rhodium and iridium having the general formula $(C_5R_5M)_2H_xL_{4-x}.yHL$ where $C_5$ is the cyclopentadienyl ring, $R_5$ are the methyl group substituents attached to the ring, M is rhodium or iridium or a mixture of rhodium and iridium, H is hydrogen, L is any one of halide, trifluoroacetate or hexafluorophosphate, $x$ is any number from 1 to 3, and $y$ is 0 or 1.

2. A compound as claimed in claim 1, where L is chloride.

3. A compound as claimed in claim 1, and including the base material triethylamine.

4. A compound as claimed in claim 3, wherein M is rhodium and including up to 1000 mol percent of triethylamine.

5. A compound as claimed in claim 3, wherein M is iridium and including up to 150 mol percent of triethylamine.

6. A compound as claimed in claim 1, and comprising one of μ-chloro-μ-hydridodichlorobis (pentamethylcyclopentadienyl)di-iridium; μ-chloro - μ - hydridodichlorobis (pentamethylcyclopentadienyl)di-rhodium; a salt of di-μ-trifluoroacetato - μ - hydridobis(pentamethylcyclopentadienyl)di-rhodium monocation; a salt of di-μ-trifluoroacetate - μ-hydridobis(pentamethylcyclopentadienyl)di-iridium monocation, a salt of di-μ-trifluoroacetatobis(pentamethylcyclopentadienyl)di-iridium monocation; a salt of μ-chloro - μ - hydridodichlorobis(pentamethylcyclopentadienyl)di-rhodium; or a salt of tri-μ-hydridobis(pentamethylcyclopentadienyl)di-iridium.

7. A process for the production of catalytic compounds comprising the step of hydriding a precursor compound of the general formula $(C_5R_5ML_2)_2$ to a compound of the general formula $(C_5R_5M)_2H_xL_{4-x}.yHL$ where $C_5$ are the methyl group substituents attached to the ring, M is rhodium or iridium or a mixture of rhodium and iridium, H is hydrogen, L is any one of halide, trifluoroacetate or hexafluorophosphate, $x$ is any number from 1 to 3, and $y$ is 0 or 1, wherein the hydriding step is effected using as a hydriding agent one of sodium borohydride in isopropanol, hydrogen gas, hydrogen gas in triphenylamine, and potassium hydroxide in isopropanol.

8. A process as claimed in claim 7, wherein L is chloride.

References Cited

White et al.: J. Chem. Soc. (D) (Chemical Communications), July 1971, pp. 734–5.

Kang et al.: J. Am. Chem. Soc. 91 (1969), pp. 5970–7.

Moseley et al.: J. Chem. Soc. A (1970), pp. 2875–81.

DANIEL E. WYMAN, Primary Examiner

A. P. DEMERS, Assistant Examiner

U.S. Cl. X.R.

252—431 C, 431 N, 431 P; 260—429 R, 666 P, 667, 683.15 D, 683.9